Figure 2A:
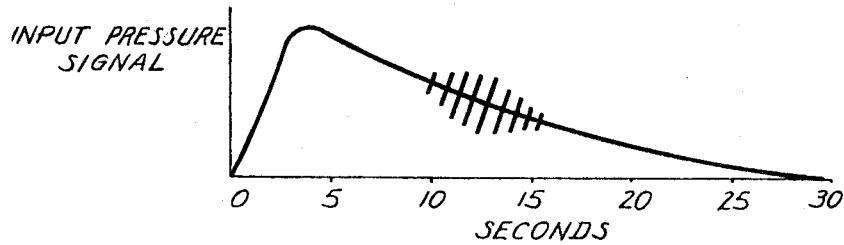
Figure 2B:
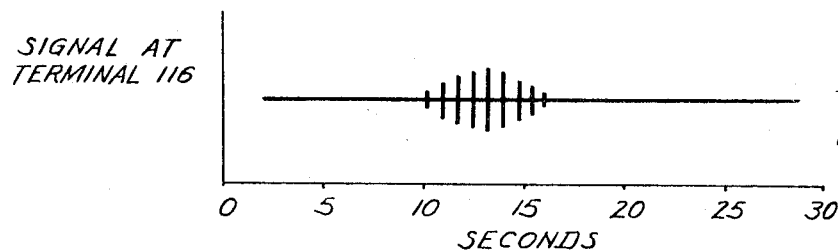

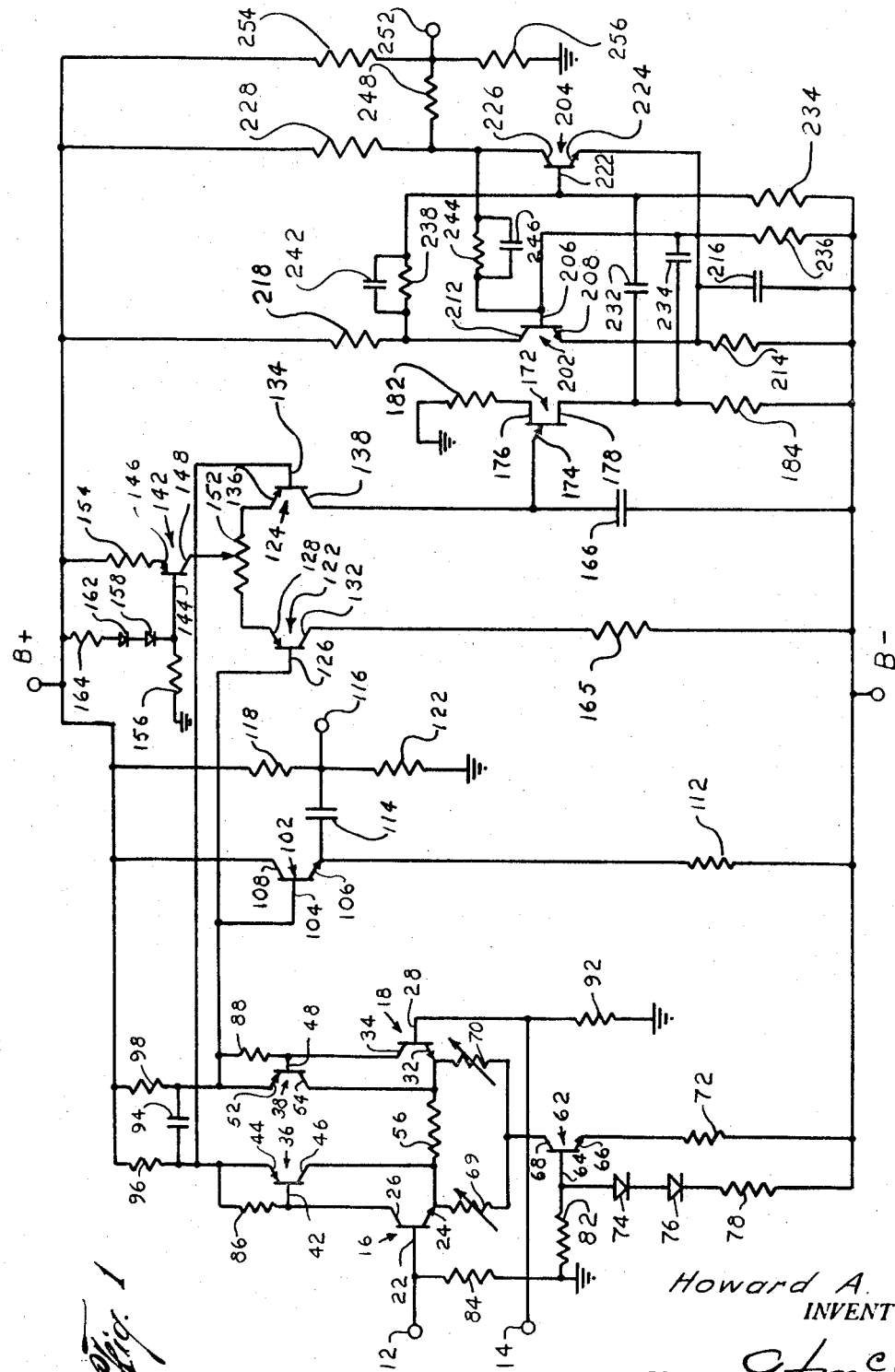

Sept. 16, 1969  H. A. VICK  3,467,837
BLOOD PRESSURE MEASURING SYSTEM FOR SEPARATING AND
SEPARATELY RECORDING D.C. SIGNAL AND
AN A.C. SIGNAL Filed Dec. 27, 1966  2 Sheets-Sheet 2

Howard A. Vick
INVENTOR

BY

ATTORNEYS

United States Patent Office 3,467,837
Patented Sept. 16, 1969

3,467,837
BLOOD PRESSURE MEASURING SYSTEM FOR SEPARATING AND SEPARATELY RECORDING D.C. SIGNAL AND AN A.C. SIGNAL
Howard A. Vick, Houston, Tex., assignor to the United States of America as represented by the Administrator of the National Aeronautics and Space Administration
Filed Dec. 27, 1966, Ser. No. 605,092
Int. Cl. H03k 5/20
U.S. Cl. 307—260                3 Claims The invention described herein was made by an employee of the United States Government, and may be manufactured and used by or for the Government for governmental purposes without the payment of any royalties thereon or thereunder.

The invention relates in general to blood pressure measuring systems, more particularly to a system for separating and separately recording a D.C. blood pressure signal and an A.C. signal representative of Korotkoff sounds.

Systolic and diastolic blood pressure for diagnostic purposes are generally measured by means of a pressure device which is applied to a prachial artery until blood circulation stops and no pulse is present. As the pressure is released, the Korotkoff sounds, caused by the beginning of the pulse, are representative of the systolic blood pressure. Upon continuing to release the pressure, the Korotkoff sounds disappear when the diastolic blood pressure is reached.

The blood pressure signal contains two components which are mixed together: a D.C. pressure signal and the Korotkoff sounds, which is an A.C. signal at approximately 36 cycles per second. Because of the frequency response recording limitations of certain tape recorders, both signals cannot be recorded on the same channel.

Further, for recording accuracy the D.C. blood pressure signal must be converted to a frequency modulated signal, which requires use of a voltage controlled oscillator (VCO). Most VCOs are inherently power consuming, or become nonlinear over a wide deviation range. Should an R-C multivibrator be used, the frequency range becomes limited since this type of multivibrator becomes nonlinear over wide frequency ranges. While squareloop transformer oscillators may be linear over the frequency range of interest, this type of oscillator requires large amounts of power.

To record both the A.C. and D.C. signals of the blood pressure, the reprogramming system of the present invention separates the two signals, and the Korotkoff sounds are recorded on one channel and the D.C. pressure signal is converted to a frequency modulated signal and recorded on another channel. Thus, the inherent frequency limitations of the recorder are avoided, and an accurate record of the blood pressure signal may be made.

More particularly, the invention comprises a differential amplifier, one output of which is the A.C. Korotkoff signal. The D.C. output of the differential amplifier varies the output of a constant current generator which, in turn, varies the frequency of a unijunction transistor oscillator. The output of the oscillator is coupled to a bistable flip-flop circuit which produces a symmetrical output signal representative of the D.C. portion of the blood pressure signal.

The advantage of this invention, both as to its construction and mode of operation, will be readily appreciated as the same become better understood by reference to the following detailed description when considered in connection with the accompanying drawings in which like reference numerals designate like parts throughout the figures, and wherein:

FIG. 1 is a circuit diagram of the blood pressure reprogramming system in accordance with this invention; and FIG. 2 (A–E) are waveforms of the voltage at various portions of the circuit of FIG. 1.

Referring now to the drawing, there is shown in FIG. 1 a reprogramming adapter in accordance with the invention. A differential input signal is applied across a pair of input terminals 12, 14. The input signal is fed to a differential amplifier having a first pair of transistors 16, 18. The transistor 16 comprises a base 22 which is connected to input terminal 12, an emitter 24, and a collector 26. The transistor 18 comprises a base 28 connected to the input terminal 14, an emitter 32, and a collector 34. The differential amplifier further comprises a second pair of transistors 36, 38. The transistor 36 comprises a base 42 which is connected to the collector 26 of transistor 16, an emitter 44, and a collector 46. The transistor 38 comprises a base 48 connected to collector 34 of transistor 18, an emitter 52, and a collector 54. The collector 46 is connected to emitter 24, and the collector 54 is connected to emitter 32. Further, a resistor 56, which determines the gain of the differential amplifier, is connected between emitter 24 and emitter 32.

A transistor 62, which forms a constant current generator comprises a base 64, an emitter 66, and collector 68. The collector 68 is connected to emitter 24 through a first variable resistor 69, and to the emitter 32 through a second variable resistor 70. Either the resistor 69 or the resistor 70, or both, are used to adjust the zero point of the differential amplifier. The emitter 66 is connected through a biasing resistor 72 to a source of negative potential (B—). The base 64 is connected to a first temperature compensating diode 74 at its anode. The cathode of the diode 74 is connected to a second temperature compensating diode 76 at its anode. The cathode of she diode 76 is connected to one side of a resistor 78, the other side of which is connected to the source of negative potential. A resistor 82 is connected between ground and the base 64, and a biasing resistor 84 is connected between the base of transistor 16 and ground. The resistors 78 and 82, together with the temperature compensating diodes 74, 76, provide the correct base-emitter voltage drop for the transistor 62. A biasing resistor 86 is connected across base-emitter circuit of transistor 36 and a biasing resistor 88 connected across the base-emitter circuit of transistor 38. Further, a biasing resistor 92 is connected between base 28 and ground. An R–C circuit, which reduces the A.C. gain of the Korotkoff sounds which are approximately 36 cycles per second, is formed of a capacitor 94 and a pair of resistors 96, 98. The capacitor 94 is connected across the emitter 44 and the emitter 52. The resistor 96 is connected between one side of capacitor 94 and a source of positive potential (B+), and the resistor 98 is connected between the other side of capacitor 94 and the source of positive potential.

The 36 c.p.s. Korotkoff sounds are amplified by an emitter-follower transistor 102 which provides a high impedance path for the D. C. portion of the signal. The transistor 102 comprises a base 104, emitter 106, and collector 108. The emitter 52 of transistor 38 is connected to the base 104, and the collector 108 is connected to the source of positive potential. The emitter 106 is connected to one side of a biasing resistor 112, the other side of which is connected to the source of negative potential. The emitter 106 is further connected through a D.C. blocking capacitor 114 to an A.C. output terminal 116. A resistor 118 is connected between the source of positive potential and the output terminal 116, and a resistor 122 is connected between the output terminal 116 and ground.

The D.C. portion of the signal from the first differential amplifier is fed to a second differential amplifier formed of a first transistor 122 and a second transistor 124. The transistor 122 comprises a base 126, an emitter 128, and a collector 132. The transistor 124 comprises a base 134, an emitter 136, and a collector 138. The second differential D.C. amplifier further comprises a transistor 142 which forms a constant current source. The transistor comprises a base 144, an emitter 146, and a collector 148, the collector 148 being connected to a tap on a resistor 152. The resistor 152 is collected between the emitter 128 of transistor 122 and the emitter 136 of transistor 124. The emitter 146 is connected through a resistor 154 to the source of positive potential.

The emitter 44 of transistor 36 is connected to the base 134 of transistor 124, and the collector 138 of transistor 124 is connected to one side of a charging capacitor 166, the other side of the capacitor being connected to the source of negative potential.

A voltage controlled oscillator (VCO) is formed of a unijunction transistor 172 having an emitter 174, a first base 176, and a second base 178. The collector 138 of transistor 124 is connected to emitter 174. The first base 176 is connected through a resistor 182 to ground, and a second base 178 is connected through a resistor 184 to the source of negative potential.

The output of the VCO is coupled to a bistable flip-flop circuit formed of a first transistor 202 and a second transistor 204. The transistor 202 comprises a base 206, emitter 208, and collector 212. The emitter 208 is connected through the parallel combination of a resistor 214 and a capacitor 216 to the source of negative potential, and the collector 212 is connected through a resistor 218 to a source of positive potential.

The transistor 204 comprises a base 222, an emitter 224, and a collector 226. The emitter 224 is connected to emitter 208 of transistor 202, and the collector 226 is connected through a resistor 228 to the source of positive potential.

The second base 178 of unijunction transistor 172 is connected to one side of a capacitor 232, the other side of which is connected to both the base 222 and through a resistor 234 to the source of negative potential. The second base 178 is also connected to one side of a second capacitor 234, the other side of which is connected to both the base 206 and through a resistor 236 to the source of negative potential. The collector 212 is connected through a first parallel circuit comprising a resistor 238 and capacitor 242, to the base 222. Further, the collector 226 is connected through a second parallel circuit comprising a resistor 244 and capacitor 246, to the base 206. Output signals from the flip-flop circuit are taken from collector 226 and fed through a resistor 248 to a pressure signal output terminal 252. Further, a resistor 254 is connected between the output terminal 252 and the source of positive potential, and a resistor 256 is connected between output terminal 252 and ground.

With the foregoing in mind, operation of the circuit of FIG. 1 with reference to FIGS. 2 (A through E) is as follows:

An input signal as shown in FIG. 2A is applied across the input terminals 12, 14. The input signal is representative of the blood pressure, and contains a D.C. component which represents the occluding cuff pressure and an A.C. component superimposed thereon which represents the Korotkoff sounds. The input terminals 12, 14 are connected to the base of transistors 16, 18, respectively, and these two transistors, in conjunction with transistors 36, 38 form a high gain differential amplifier. As the input signal increases, the current increases in the transistors 16 and 36, and decreases in transistors 18 and 38. The current change through the transistors results in a voltage change across resistors 96, 98, the voltage increasing across resistor 96 and decreasing across resistor 98.

The A.C. gain of this input amplifier section is controlled by the capacitor 94. The amplified Korotkoff sound signal is coupled to the base 104 of transistor 102 which provides the correct buffering of the input amplifier. The Korotkoff sound signal is then coupled from the emitter 106 through a blocking capacitor 114 to the A.C. output terminal 116, the signal appearing at terminal 116 being shown in FIG. 2B.

Figure 2C:
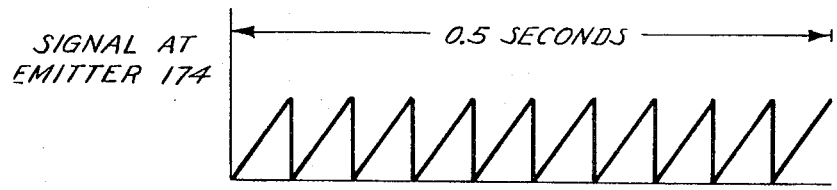
Figure 2D:
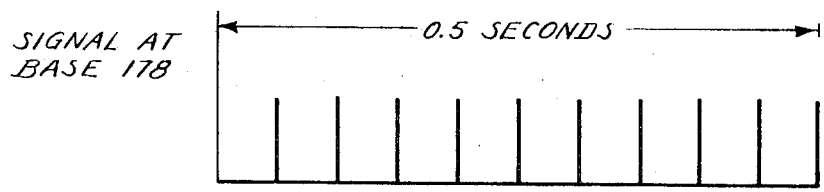
Figure 2E:
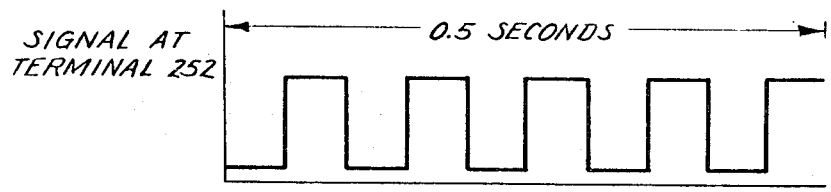

The increasing voltage across the resistor 96, which is the D.C. portion of the input signal, is applied to the base 134 of transistor 124, which causes the current to further increase in that respective leg of the amplifier formed by transistor 122 and 124. As the current increases in the transistor 124, the charging rate of the capacitor 166 is increased. As the charging rate is increased, the rate at which the unijunction transistor input pulses at emitter 174, as shown in FIG. 2C, and output pulses at base 178, as shown in FIG. 2D, increases thereby increasing the pulse rate frequency applied to the bistable multivibrator formed by transistor 204 and 212. The output at terminal 252 is, as shown in FIG. 2E, a square wave of a frequency one-half the frequency of the unijunction oscillator.

The A.C. signal, whose output is obtained at terminal 116, and a pulse signal representative of the D.C. portion of the signal, whose output is obtained at terminal 252, may be separately recorded on different channels. Thus, the inherent frequency limitations of the recorder are avoided and an accurate record of the blood pressure may be made and later reproduced and compiled with a minimum of signal loss.

It should be further understood that the foregoing disclosure relates only to preferred embodiments of the invention and that it is intended to cover all changes and modifications of the example herein chosen for the purpose of the disclosure which do not constitute departures from the spirit and scope of the invention.

What is claimed and desired to be secured by Letters Patent is:

1. A reprogramming system for separating and separately recording an input signal having a D.C. component and an A.C. component superimposed thereon comprising:
 (A) a first differential amplifier having input terminals and output terminals;
 (B) means for applying said input signal across the input terminals of said first differential amplifier;
 (C) means for coupling said A.C. component of said input signal from one of said first differential amplifier output terminals to an A.C. output terminal;
 (D) a second differential amplifier having input terminals and output terminals;
 (E) means for coupling said D.C. component from another of said first differential amplifier output terminals to said second differential amplifier input terminals;
 (F) an oscillator having input means and output means for producing pulses representative of said D.C. component at said second differential amplifier output terminals;
 (G) a charging capacitor coupled to said second differential amplifier output terminals and across said oscillator input means;
 (H) means for producing a square-wave having a frequency one-half the frequency of said pulses produced by said oscillator at a D.C. output terminal having input means and output means, said square-wave producing means input means being coupled to said oscillator output means.

2. A reprogramming system in accordance with claim 1 wherein said oscillator comprises a unijunction transistor having an emitter, a first base and a second base, said charging capacitor being coupled to said unijunction transistor emitter and one of said unijunction transistor bases being coupled to said square-wave producing input means.

3. A reprogramming system in accordance with claim 1 wherein said means for producing a square-wave comprises a bistable multivibrator.

References Cited

"Blood Pressure Measuring" by Fiegel, Jr. in IBM Technical Disclosure Bulletin, vol. 8, No. 6 dated November 1965, p. 871.

ARTHUR GAUSS, Primary Examiner

S. D. MILLER, Assistant Examiner

U.S. Cl. X.R.

328—60, 147; 307—235; 128—2.05